United States Patent [19]

Usry

[11] 3,916,941
[45] Nov. 4, 1975

[54] THROTTLE VALVE ASSEMBLY

[75] Inventor: Joe D. Usry, Salt Lake City, Utah

[73] Assignee: E-Systems, Inc., Dallas, Tex.

[22] Filed: Apr. 24, 1974

[21] Appl. No.: 463,552

[52] U.S. Cl. .................. 137/340; 251/214; 251/282
[51] Int. Cl.² ......................................... F16K 49/00
[58] Field of Search ........... 251/133, 214, 215, 282; 137/340

[56] References Cited
UNITED STATES PATENTS

| | | | |
|---|---|---|---|
| 2,074,091 | 3/1937 | MacKinnon | 137/340 |
| 2,980,139 | 4/1961 | Lynn | 251/282 X |
| 2,981,278 | 4/1961 | Bergson | 137/340 |
| 3,123,057 | 3/1964 | Exline | 137/340 X |
| 3,247,863 | 4/1966 | Jerkins | 137/340 |
| 3,332,660 | 7/1967 | Slawinski et al. | 137/340 X |
| 3,596,871 | 8/1971 | Rothrock | 251/282 X |
| 3,722,801 | 3/1973 | Chapuis | 251/282 X |

FOREIGN PATENTS OR APPLICATIONS

| | | | |
|---|---|---|---|
| 1,272,668 | 7/1968 | Germany | 251/214 |
| 419,122 | 11/1934 | United Kingdom | 137/340 |

*Primary Examiner*—Henry T. Klinksiek
*Attorney, Agent, or Firm*—Robert V. Wilder

[57] ABSTRACT

High temperature steam is throttled by a valve coupled to a conventional electromechanical actuator having a standard temperature rating. The steam throttle valve is displaced from the electromechanical actuator to thermally isolate the actuator from the high temperature steam. Both the steam valve housing and the actuating stem of a controlling pintle movable with the housing are cooled by a water jacket interposed between the steam valve and the actuator. To further minimize heat transfer from the steam valve housing to the water jacket, a thermal isolation stand-off is inserted between the valve housing and the water jacket. To minimize friction in the steam valve, the pintle is provided with a labyrinth seal. All external dynamic and static seals exposed to the high temperature steam are eliminated thereby reducing maintenance problems and improving safety.

9 Claims, 5 Drawing Figures

THROTTLE VALVE ASSEMBLY

This invention relates to a throttle valve, and more particularly to a high temperature fluid throttle valve controlled by a standard temperature rated actuator.

Heretofore, high temperature steam throttle valves utilized external high pressure packing to provide a steam seal around the valve stem. By necessity, these external high pressure packings resulted in a significant amount of friction between the valve stem and the seal. This required actuators not only powerful enough to move the valve itself, but also overcome the packing friction. Another significant problem of external packing arrangements is the ever present danger of escaping steam as the packing wears. This necessitates extreme safety precautions and further requires that the controlling actuator is capable of operating in a high temperature environment.

A feature of the present invention is to provide a high temperature throttle valve wherein only minimal packing friction is developed thereby enabling the use of a low power actuator. This actuator may be electrically energized thereby resulting in a motorized valve. Most prior art high temperature throttle valves utilize powerful hydraulic actuators to control the pintle movement.

Another feature of the present invention is to provide a high temperature throttle valve utilizing internal dynamic seals that minimize the possibility of the leakage of a high temperature fluid around an external packing. All dynamic seals are located between the valve housing and a water jacket surrounding the valve stem.

Still another feature of the present invention is to provide a high temperature throttle valve including a water cooled valve stem. Water cooling the valve stem eliminates the need for external or static high temperature seals and further isolates the valve actuator from the high temperature valve. Further thermal isolation is provided by a thermal isolation standoff between the valve housing and the water jacket. By maintaining the water pressure through the water jacket slightly higher than the controlled fluid pressure through the throttle valve, any packing leakage will be in the direction toward the high temperature fluid.

In accordance with one embodiment of the invention, a flow control assembly includes a fluid throttle valve having a housing with an inlet port and an outlet port opening into a chamber. A pintle is mounted in the chamber to control the flow of fluid between the inlet and outlet ports and includes a valve stem extending from the valve housing. Coupled to the extending valve stem is an actuator to position the pintle for fluid control. Positioned between the throttle valve and the actuator is a cooling chamber that encloses the valve stem to thermally isolate the actuator from the throttle valve.

A more complete understanding of the invention and its advantages will be apparent from the specification and claims and from the accompanying drawings illustrative of the invention.

Referring to the drawings.

Figure 1:
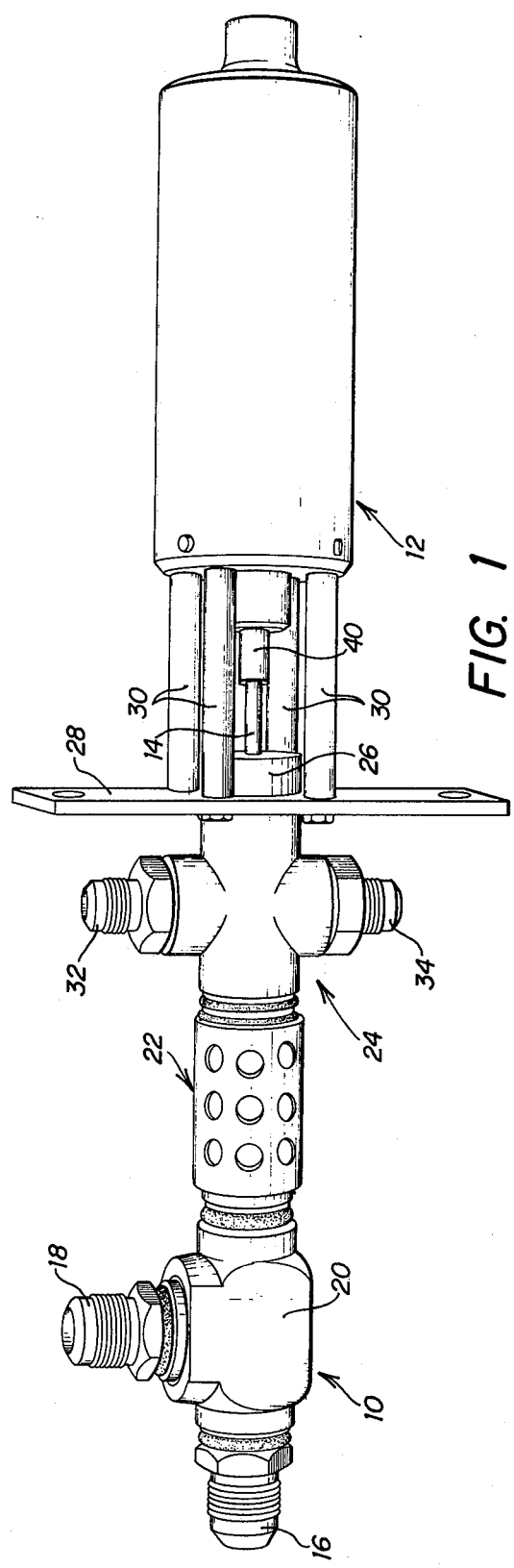
FIG. 1 is a perspective view of a high temperature throttle valve and actuator assembly including a thermal isolation standoff and a water chamber between the valve and actuator.

Referring to FIG. 1, there is shown an embodiment of a high temperature steam valve and actuator assembly of the present invention including a steam throttle valve 10 coupled to an electromechanical actuator 12 by means of a valve stem 14. Typically, the steam throttle valve 10 is designed to control 1000° F. steam and includes an inlet port 16 and an outlet port 18. A source of steam or other fluid is applied to the inlet port 16 and controlled by the throttle valve 10 for discharge through the outlet port 18. Both the inlet port and outlet port are standard fittings welded or otherwise secured to a valve housing 20. In one experimental model of the invention, the steam throttle valve 10 was made of stainless steel.

As illustrated, the steam throttle valve (controlling 1000° F. steam) is isolated from the electromechanical actuator 12 having a standard temperature rating of 200° F. This thermal isolation is achieved by interposing between the valve 10 and the actuator 12 a thermal isolator standoff 22 and a water chamber or jacket 24. The valve stem 14 extends through both the thermal isolator standoff 22 and the water jacket 24 with the latter cooling the valve stem 14 by water passing through the jacket. Typically, 170° F. water is piped through the water jacket 24 from an inlet fitting 32 and discharged through an outlet fitting 34. To prevent excessive heat transfer from the steam throttle valve 10 to the jacket 24 the thermal isolator standoff 22 is inserted between these two.

To support the steam valve and actuator assembly, a seal cap 26 is adapted to be threaded into the water jacket 24. Between the seal cap 26 and the jacket 24 is a mounting flange 28 to which is mounted the actuator 12 by means of spacers 30.

In one installation of the steam valve and actuator assembly of FIG. 1, 170° F. water was piped through the fitting 32 into the water jacket 24 and from the outlet fitting 34 into a steam generator. The output of the steam generator was coupled to the inlet port 16 of the valve 10 with the valve providing control of steam from the outlet port 18. In this installation, the pressure in the water jacket 24 was approximately 50 psi greater than the pressure in the steam throttle valve 10. Any leakage around the seals of either the throttle valve 10 or the water jacket 24 was in the direction from the low temperature water into the high temperature steam. This minimizes the chances of high temperature steam escaping and creating an operational hazard.

Figure 2:
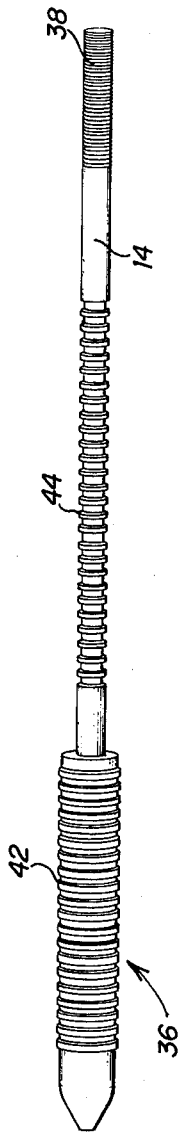
FIG. 2 is a perspective view of a pintle and extending valve stem for the valve of FIG. 1.

Referring to FIG. 2, there is shown a perspective of a pintle 36 for control of steam through the throttle valve 10 with the valve stem 14 extending from the pintle. The valve stem 14 terminates in an external threaded section 38 for coupling to the electromechanical actuator 12 by means of a coupling shaft 40.

A requirement of a steam throttle valve controlled from an electromechanical actuator is the utilization of low friction seals. This is achieved in the valve and actuator assembly of FIG. 1 by utilizing a labyrinth seal 42 on the pintle 36 and a labyrinth seal 44 of the valve stem 14. Diametrial clearances for these seals are greater than 0.005 inches resulting in a very low coefficient of friction. By utilizing the labyrinth seals 42 and 44 no external dynamic or static seals are employed in the assembly of FIG. 1 thus minimizing a basic maintenance problem and improving operational safety.

Figure 3:
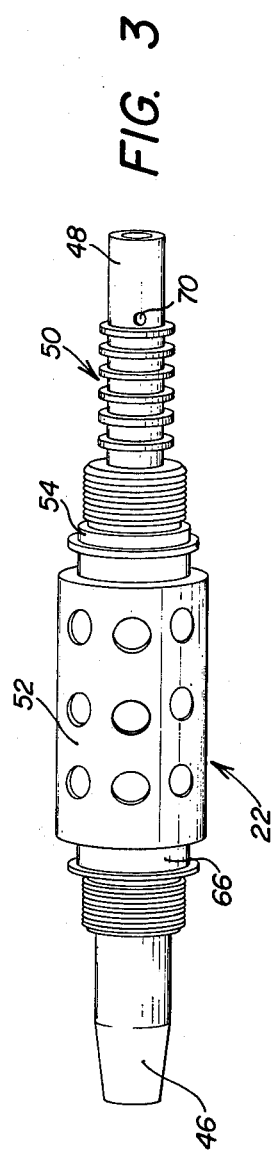
FIG. 3 is a perspective view of the thermal isolation standoff of the valve of FIG. 1.

Referring to FIG. 3, the pintle 36 is mounted in a pintle guide 46 that terminates in a housing extension 48. The valve stem 14 extends through the extension 48 as the pintle 36 moves in the guide 46. Encircling the extension 48 at a point within the water jacket 24 are cooling fins 50 to increase the surface area of the extension 48 exposed to cooling water flowing through the jacket.

The extension 48 is a thin walled member that is weak in bending and torsion. To provide structural strength, a support tube 52, comprising a part of the thermal isolator standoff 22, is welded between the pintle guide 46 and a fitting 54 that threadedly engages the water jacket 24. The support tube 52 is a thin walled member and perforated to minimize heat transfer between the valve housing 20 and the water jacket 24.

Figure 4:
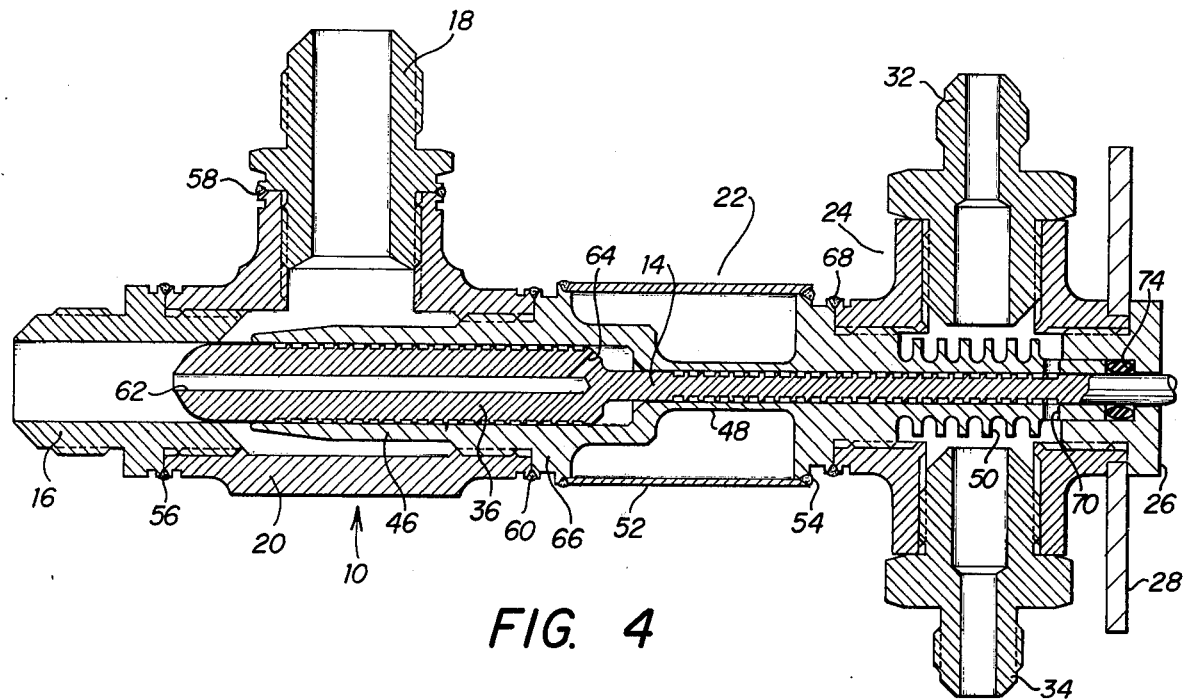
FIG. 4 is a cross-section of a high temperature valve assembly with labyrinth seals around the pintle and valve stem.

Referring to FIG. 4, there is shown in cross-section the valve assembly of FIG. 1 including the valve housing 20 with the inlet port 16 and the outlet port 18 assembled into the housing and welded in place by means of welds 56 and 58. Also assembled into the chamber of the housing 20 is the pintle guide 46 again secured in place by means of a weld 60.

Positionable within the pintle guide 46 is the pintle 36 that includes a longitudinal passage 62 terminating at an angular passage 64 opening at the head of the pintle. This provides for a balanced pintle operation to establish a minimum pressure differential across the pintle and thereby further reduce actuator force requirements.

Extending from a flange 66 supporting the pintle guide 46 to the housing 20 is the housing extension 48 that has an internal dimension to mate with the external labyrinth seal of the valve stem 14. The extension 48 includes the fitting 54 for threadedly engaging into the water jacket 24. Again, to eliminate static seals, a weld 68 secures the fitting 54 to the water jacket 24. Within the water jacket 24 the cooling fins 50 are positioned to be in the stream of water flow through the jacket 24 from the inlet fitting 32 through the jacket to the outlet fitting 34.

At one end of the cooling fins 50 there is a transverse passage 70 through the extension 48. This passage opens the external chamber of the water jacket 24 to the valve stem 14. As mentioned previously, where the operating pressure of the water jacket 24 is higher than the operating pressure of the steam throttle valve 10 any leakage around the seals 42 and 44 will be in the direction from the higher pressure water into the lower pressure steam through the passage 70. Any water leaking around the seals 44 and 42 will flash to steam prior to reaching the end of the pintle guide 46. Thus, the danger to escaping steam is minimized.

For applications where the water jacket 24 is maintained at a lower operating pressure than the valve 10, any leakage around the seals 42 and 44 will also be confined within the assembly. High temperature steam escaping past the seals 42 and 44 will be quenched and discharged into the water jacket 24. Again, the possibility of high temperature steam escaping is minimized.

Threaded into the upper end of the water jacket 24 is a seal cap 26 that has an inner diameter 72 to fit over the extension 48 to provide further support of this relatively weak member. At the end of the extension 48, within the seal cap 26, there is an elastomeric O-ring seal 74 to minimize the possibility of steam or water escaping onto the actuator 12.

Welded between the flange 66 and the fitting 54 is the support tube 52 as a part of the thermal isolator standoff 22. To provide maximum rigidity, the support tube 52 is welded to both the flange 66 and the fitting 54.

Figure 5:
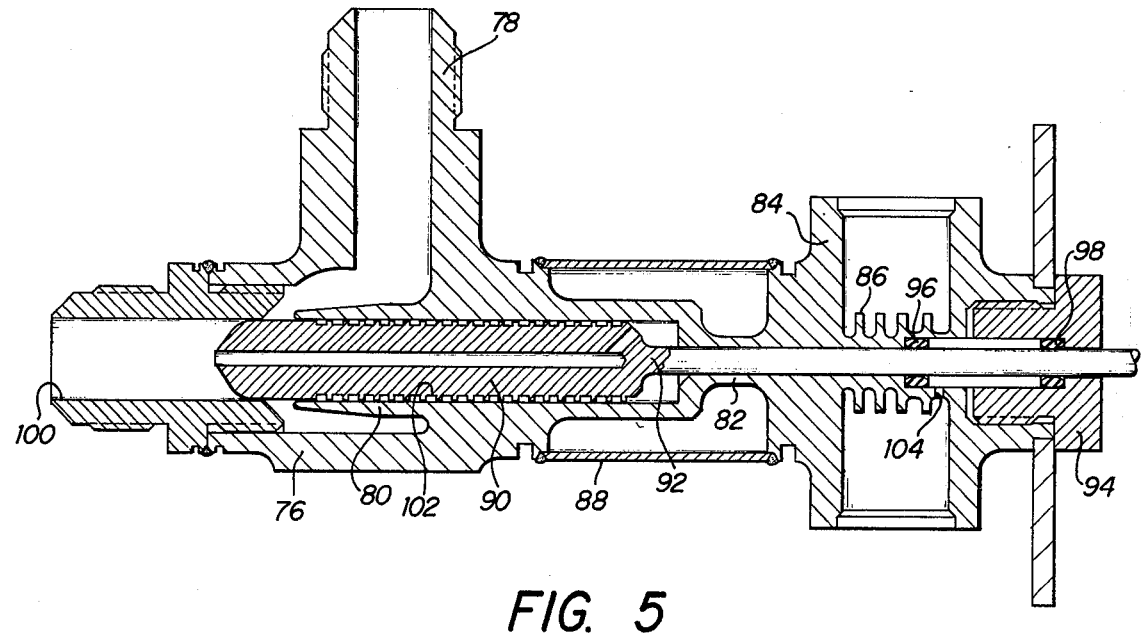
FIG. 5 is an alternate embodiment of a steam valve assembly including labyrinth seals around the valve pintle and an O-ring seal around the valve stem.

Referring to FIG. 5, there is shown a modification of the valve configuration of FIG. 4 wherein a shortened housing extension is utilized between a valve housing 76 and the water jacket 84. The valve housing 76, in the embodiment of FIG. 5, includes an outlet port 78 and a valve guide 80 formed as an integral unit. A housing extension 82 is also formed as an integral unit with the housing 76 to minimize static seals or welded seams. At a point displaced from the valve housing 76 the water jacket 84 is formed as an integral part of the housing extension 82. Within the chamber of the jacket 84 there is formed a series of cooling fins 86. Inlet and outlet fittings for the water jacket 84 are threaded into the jacket as illustrated in FIG. 1.

A support tube 88, formed in two sections, is welded between the valve housing 76 and the jacket 84 as part of a thermal isolator standoff.

Assembled into the pintle guide 80 through the inlet section of the housing 76 is a pintle 90 similar to the pintle valve 36. Extending from the pintle 90 is a valve stem 92 that terminates above a cap 94 for coupling to an actuator 12. The cap 94 is similar to the seal cap 26 and is threaded into the water jacket 84. The valve stem 92 exits the water jacket 84 through a conventional elastomeric O-ring seal 96. The O-ring seal is required to only withstand the cooling water temperature. Also sealing the stem 92 is an O-ring seal 98 in the cap 94.

After the pintle has been assembled into the pintle guide 80 an inlet port fitting 100 is assembled and welded to the housing 76.

Operationally, the valve of FIG. 5 is similar to that of FIG. 4. valve toward said actuator; the water pressure in the jacket 84 higher than the steam pressure in the housing 76 any leakage around the labyrinth seal 102 of the pintle 90 or the O-ring seal 96 will be in the direction of water into the steam valve. This water will flash into steam prior to entering the chamber of the housing 76. Where the steam pressure is in excess of the cooling water pressure, any steam leakage will, as explained previously, be cooled into water before entering the jacket 84 through a passage 104.

The electromechanical actuator 12 for use with either of the valves as described may typically consist of a DC permanent magnet torque motor geared through an Acme screw drive to convert a torque-rotation into a force-linear displacement. This is a conventional construction wherein the armature of a torque motor is attached to the nut of an Acme screw wherein the screw is free to move axially, but prevented from rotation by a pin that slides in a keyway. Such a mechanism converts rotation into a linear displacement. Many commercially available actuators may be utilized with the valve as described.

While several embodiments of the invention, together with modifications thereof, have been described in detail herein and shown in the accompanying drawings, it will be evident that various further modifications are possible without departing from the scope of the invention.

What is claimed is:

1. A flow control assembly, comprising in combination:
   a fluid throttle valve including a housing having an inlet port and an outlet port opening into a chamber;
   a pintle guide connected to said housing and extending into the chamber;
   a pintle in the guide, said pintle including a valve stem extending from the housing;
   an actuator coupled to the valve stem to move the pintle for controlling the flow of fluid between the inlet and the outlet ports;
   a cooling chamber enclosing said valve stem between the housing of said throttle valve and said actuator; and
   a hollow standoff means connecting said throttle valve housing and said cooling chamber, said hollow standoff means enclosing said valve stem therein.

2. A flow control assembly as set forth in claim 1 wherein said pintle includes a plurality of axially displaced annular seals around said pintle.

3. A flow control assembly as set forth in claim 1 wherein said hollow standoff means is a cylinder and includes a plurality of openings through the wall of said cylinder.

4. A flow control assembly as set forth in claim 1 and further including stem guide means connected to said housing and said cooling chamber, said stem guide surrounding said valve stem, said stem guide means being within said hollow standoff means.

5. A flow control assembly, comprising in combination:
   a fluid throttle valve including a housing having an inlet port and an outlet port opening into a chamber;
   a pintle in the chamber to control the flow of fluid between the inlet and outlet ports and including a valve stem extending from the housing;
   a housing extension as part of the housing of said throttle valve and enclosing the valve stem;
   an actuator mounted at the end of said housing extension and coupled to the valve stem to position the pintle in the chamber;
   a cooling chamber enclosing said extension at a point displaced from said throttle valve; and
   a hollow standoff means connecting said throttle valve housing and said cooling chamber, said hollow standoff means surrounding said housing extension.

6. A flow control assembly as set forth in claim 5 and further including a plurality of axially displaced annular seals on said valve stem in said housing extension at a location before the coupling of the valve stem to said actuator.

7. A flow control assembly as set forth in claim 6 and further including a plurality of axially displaced annular seals on said pintle, said housing including a cylinder extending into the chamber and encircling said pintle.

8. A flow control assembly comprising:
   a fluid throttle valve including a housing having an inlet port and an outlet port opening into a chamber;
   a pintle in the chamber to control the flow of fluid between the inlet and outlet ports, and including a valve stem extending from the housing;
   a housing extension having one end thereof connected to said housing, said housing extension enclosing the valve stem;
   an actuator mounted at the other end of said housing extension, said actuator being coupled to the valve stem to position the pintle in the chamber; and
   a cooling chamber enclosing said extension at a point displaced from said throttle valve toward said actuator, said extension including a passage therethrough from said cooling chamber to said valve stem.

9. The flow control assembly as set forth in claim 8 and further including means for maintaining a fluid in said cooling chamber at a higher pressure than the fluid in said fluid throttle valve.

* * * * *